United States Patent Office 3,491,622
Patented Jan. 27, 1970

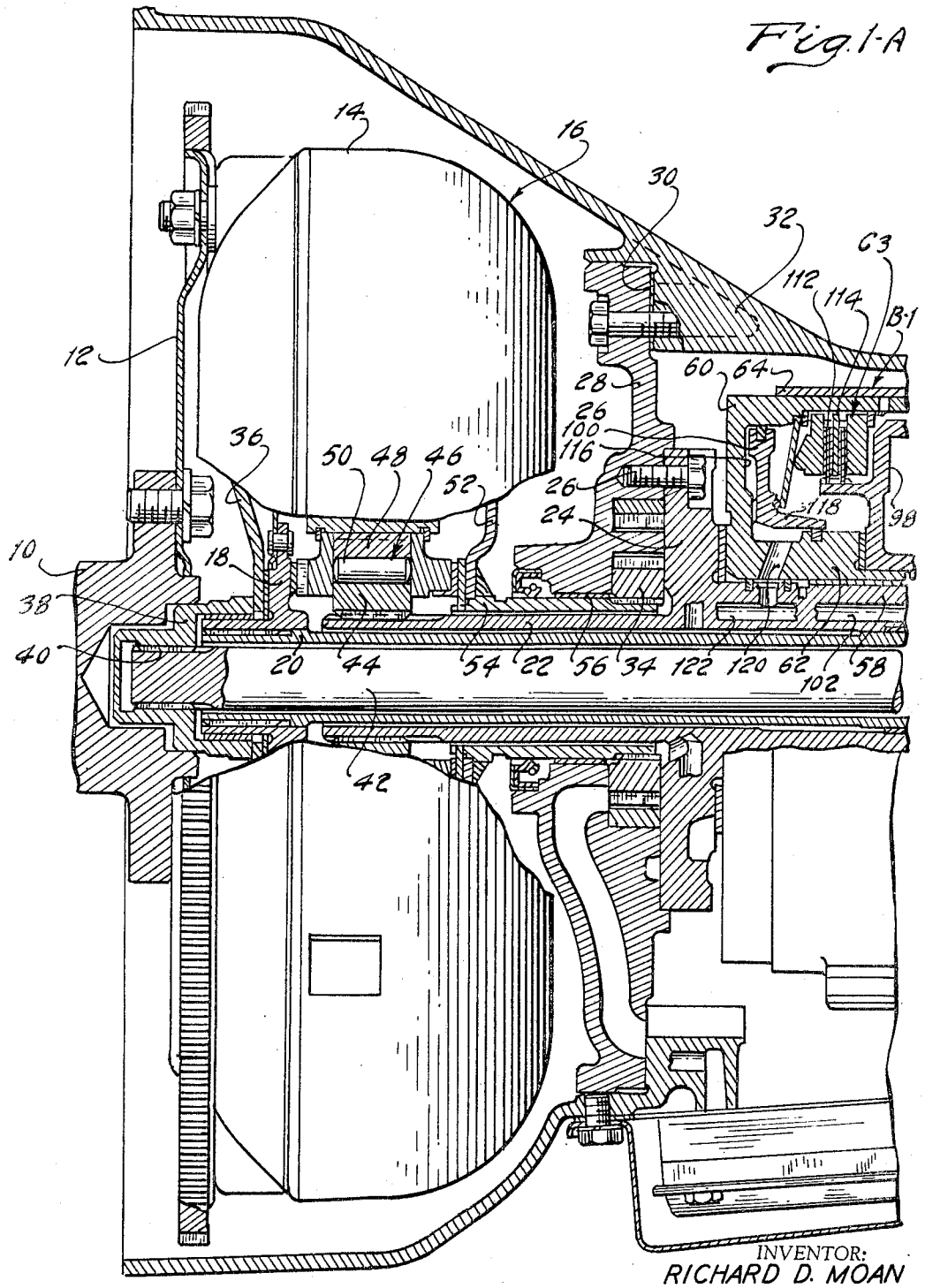

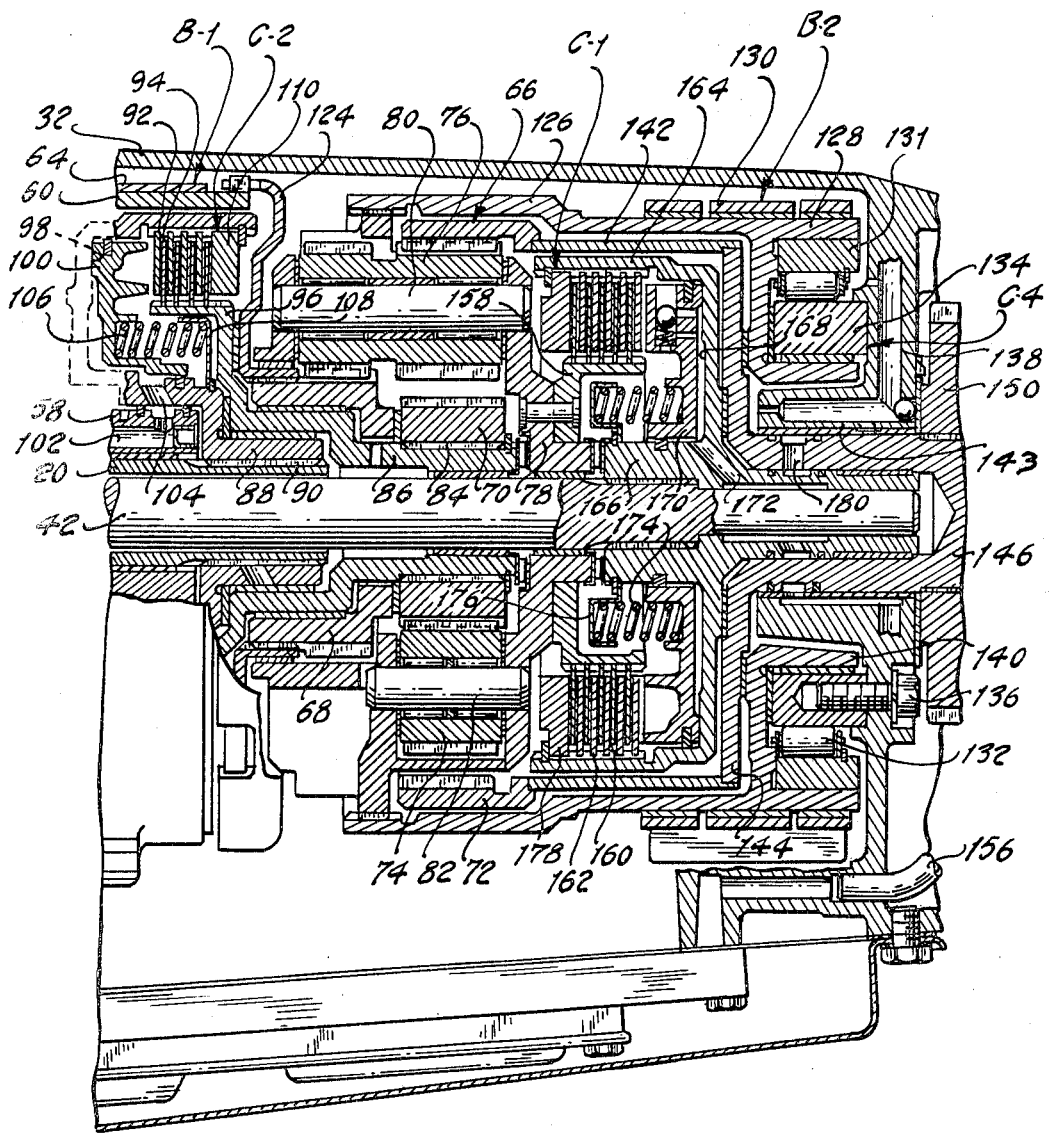
Fig. 1-B
INVENTOR:
RICHARD D. MOAN

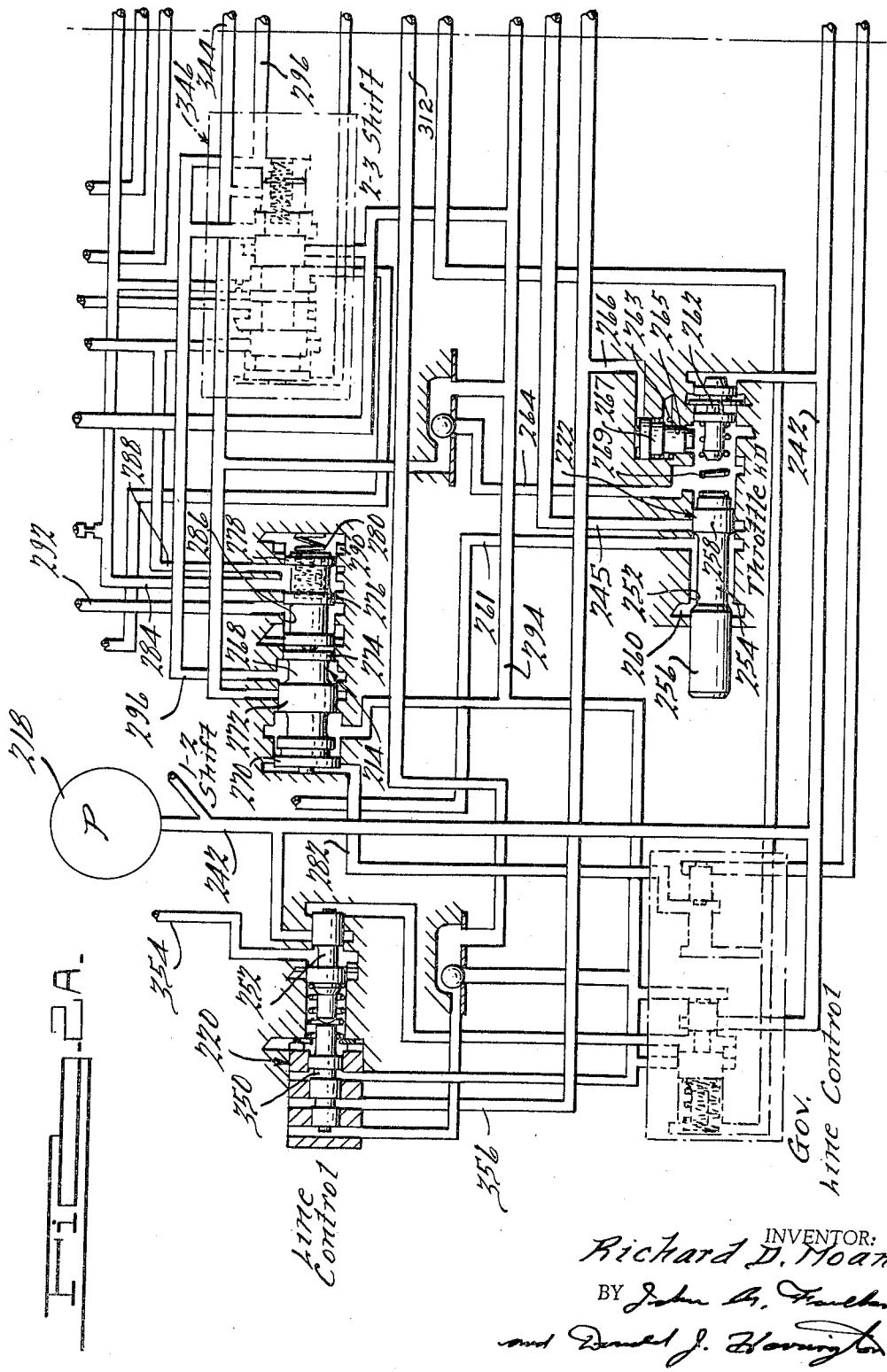

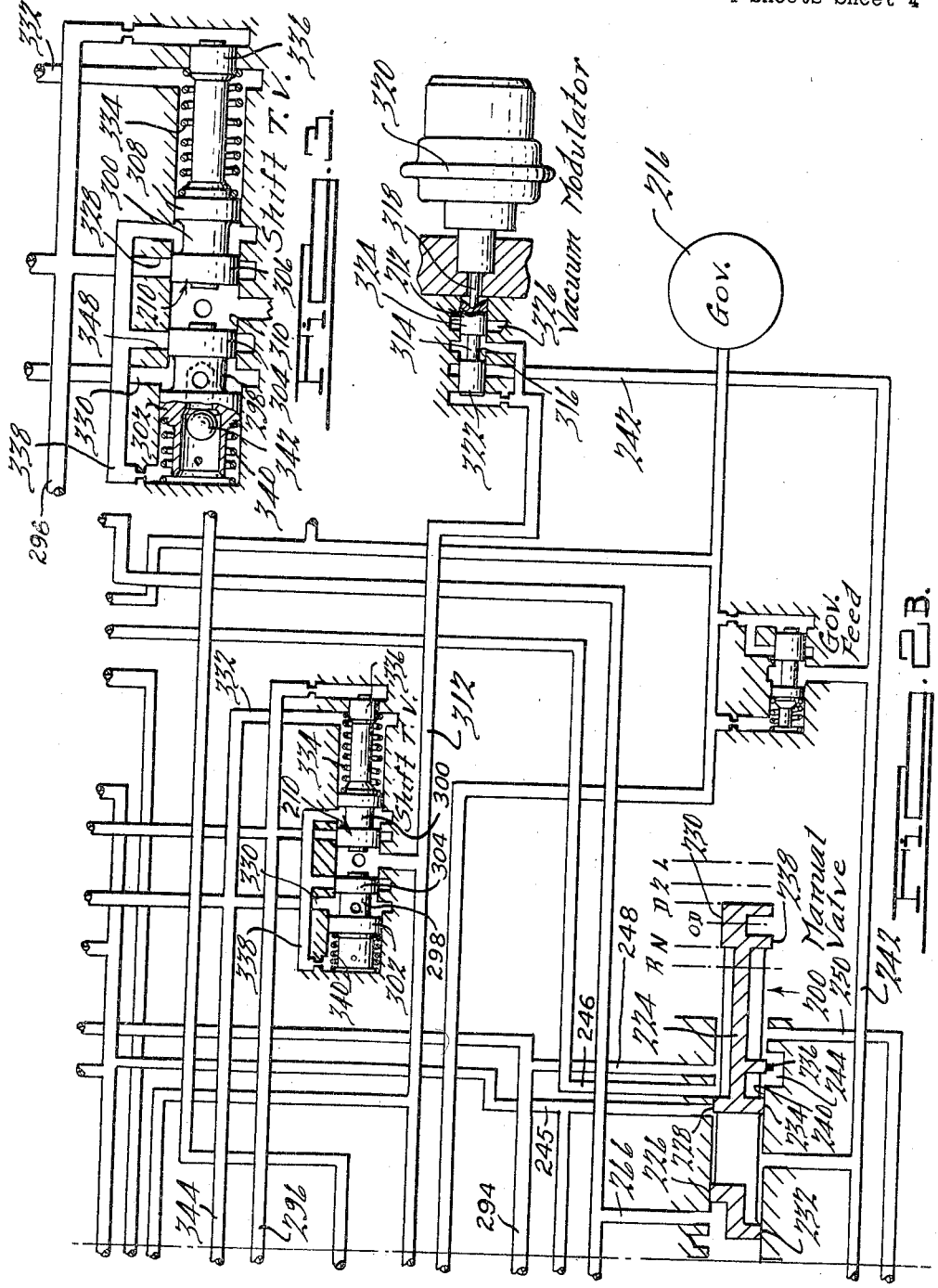

3,491,622
AUTOMATIC POWER TRANSMISSION VALVE CIRCUIT INCLUDING A MODIFIED TORQUE SENSITIVE PRESSURE SIGNAL SOURCE
Richard D. Moan, Livonia, Mich., assignor to Ford Motor Company, Dearborn, Mich., a corporation of Delaware
Filed Mar. 29, 1968, Ser. No. 717,203
Int. Cl. B60k 17/00
U.S. Cl. 74—864        8 Claims

ABSTRACT OF THE DISCLOSURE

This specification describes a throttle valve system for use in an automatic transmission valve circuit for a driveline having an internal combustion engine, wherein a compound modulator valve element is adapted to develop a torque sensitive pressure signal having a functional relationship to torque that is different at low values of engine manifold pressure than at higher values.

GENERAL DESCRIPTION OF THE INVENTION

The improvements of my invention are adapted to be used in a control valve circuit for an automatic power transmission mechanism in an automotive vehicle driveline that includes also an internal combustion engine. Valve circuits of this kind generally include planetary gearing and fluid pressure operated clutch-and-brake servos for controlling the relative motion of the gear elements. In this way automatic ratio changes are achieved.

The circuit includes a throttle valve system capable of supplying a torque sensitive pressure signal that is used by a pressure sensitive portion of the valve circuit to initiate the automatic ratio changes. The throttle valve system has two operating characteristics as it establishes a pressure signal that is proportional in magnitude to engine manifold pressure. For low values of manifold pressure, which correspond to engine carburetor throttle settings of reduced magnitude, the modulating characteristics cause a relatively subdued response so that the incremental increase in the output signal for any given change in the magnitude of the manifold pressure signal will be of a reduced order. During operation of the engine at relatively wide open throttle settings, the modulating characteristics of the throttle valve system change so that the incremental variation in the output signal of the throttle valve system will be magnified with respect to a corresponding variation in the magnitude of the input manifold pressure signal.

The output signal of the throttle valve system is distributed to pressure sensitive shift valves which are subjected also to a driven speed signal. The shift valves respond to variations in the two signals to produce automatic ratio changes as pressure from the pressure source is distributed by the shift valve to the clutch and brake servos in the power transmission gearing. The magnitude of the shift delay upon automatic upshifts from a low speed ratio to a higher speed ratio, as the vehicle accelerates, is increased when the engine is operating at relatively wide open throttle settings. The shift points can be tailored to suit the optimum performance requirements of the driveline under such conditions.

At reduced engine throttle settings, the throttle valve system is designed to supply a zero torque signal to the shift valves so that the shift delay at reduced engine throttle settings is determined only by the speed signal acting on the shift valves and the spring forces which oppose the governor speed signals.

The pressure signal developed by the torque signal pressure source is inversely proportional in magnitude to the engine manifold vacuum. This signal determines the magnitude of the shift delay as the vehicle is accelerated from a standing start. The speed signal to which the distributor valves are subjected is proportional in magnitude to the square of the driven speed. A given change in the engine manifold pressure signal then will produce a greater change in the shift point at low speeds than the corresponding change that takes place at higher speeds.

The improved throttle valve system of my invention is capable of developing a signal that increases at a lower rate upon a change in the vacuum signal at lower manifold pressure signal values, and at a higher rate at higher values of the manifold pressure signal. Furthermore, it produces a zero output pressure signal when the manifold vacuum is a maximum.

In prior art valve systems this latter characteristic is achieved usually by a throttle modulator valve that is incorporated into the fluid pressure distributor valve assembly. The modulator valve interrupts distribution of a throttle pressure signal to the shift valve assemblies when the magnitude of the manifold pressure signals is of a reduced value. This establishes a minimum throttle upshift point during the acceleration of the vehicle from a standing start.

BRIEF DESCRIPTION OF THE FIGURES OF THE DRAWING

FIGURES 1A and 1B show in longitudinal cross sectional form a multiple ratio gear system capable of embodying the improved control system of my invention.

FIGURES 2A and 2B show a schematic diagram of a portion of the valve circuit that is used to control the automatic ratio changes in the gear system of FIGURES 1A and 1B.

FIGURE 3 is an enlarged view of the shift T.V. valve of FIGURE 1B.

PARTICULAR DESCRIPTION OF THE INVENTION

In FIGURE 1A numeral 10 designates one end of the crankshaft of an internal combustion engine used in an automotive vehicle driveline. It is connected to a driveplate 12, the periphery of which is connected to the impeller shell 14 of a hydrokinetic torque converter 16.

The converter 16 includes a bladed turbine 18 having a hub that is splined to a sleeve shaft 20 extending axially through a relatively stationary stator sleeve shaft 22. The shaft 22 is connected to a pump housing wall 24. It is bolted at its periphery to an internal shoulder 30 formed in a one-piece transmission casing 32. The wall 28 and the wall 24 cooperate to define a pump chamber which receives pump elements and a positive displacement pump 34. This provides a pressure source for an automatic control valve system, not shown, which in turn distributes selectively control pressure to the clutches and brakes in the transmission system.

The impeller shell 14 includes a forward shell enclosure portion 36, which is connected directly to a pilot member 38. This in turn is splined at 40 to a central torque delivery shaft 42 which extends through the turbine sleeve shaft 20.

The stator sleeve shaft 22 has splined thereto an inner ring 44 for an overrunning brake 46. Brake 46 includes an outer race 48 which is cammed to provide a camming action with multiple brake rollers 50. A bladed stator is formed with a hub which is connected directly to the race 48.

The impeller shown in part at 52 is secured to an impeller sleeve shaft 54 journalled within an opening 56 formed in the wall 28.

A bearing support sleeve 58 is carried by wall 24. A brake drum 60 having a hub 62 is journalled on the support sleeve 58. An intermediate speed ratio brake band 64, which surrounds the drum 60, may be applied and released in the usual fashion by means of a fluid pressure operated brake servo, not shown.

A compound planetary gear unit shown generally at 66 includes a forward sun gear 68, a rearward sun gear 70 and a ring gear 72. A first set of planetary pinions 74 engage sun gear 70. A second set of planetary pinions 76 engage sun gear 68 and the planet pinions 74. Pinions 76 engage also ring gear 72.

The set of pinions 74 and the set of pinions 76 are carried by and are journalled on a common carrier 78. Pinions 76 are supported by pinion shafts 80 carried by the carrier 78 and pinions 74 are supported by pinion shafts 82 carried by the carrier 78. Sun gear 70 is splined at 84 to clutch sleeve 86 which is journalled on the shaft 42 and on clutch element 88. Turbine sleeve shaft 20 is splined at 90 to the clutch element 88.

Element 88 carries at its outer extremity clutch discs 92 which register with clutch discs 94 carried by clutch element 96. Sleeve 86 is connected to or forms a part of clutch element 96.

The clutch element 88 defines an annular cylinder 98 within which is positioned an annular piston 100. The cylinder 98 and the piston 100 cooperate to define a pressure chamber which communicates with a pressure feed passage through a supply pressure port 104. A clutch return spring 106, which is anchored on a spring seat 108, urges the piston 100 to a clutch releasing position. When fluid pressure is admitted to the port 104, piston 100 causes clutching engagement between the discs 92 and 94. The axial force reaction for the fluid pressure force is taken by the clutch pressure reaction ring 110 carried by the clutch element 88.

Second clutch discs 112 are carried also by the clutch element 88. These register with one or more clutch discs 114 carried by the brake drum 60.

An annular cylinder 116 defined by the brake drum 60 receives an annular piston 118, which cooperates with the drum 116 to define a pressure chamber. This is in fluid communication with port 120 through a clutch pressure feed passage 122 formed in the bearing support sleeve 58.

Sun gear 68 is connected to drum 60 by means of a torque transfer member 124. This member provides also a bearing support for carrier 78.

Carrier 78 is connected drivably to brake drum extension 126. The brake drum 128, of which the extension 126 is a part, is surrounded by a brake band 130. Band 130 can be applied and released to selectively anchor the drum 126 by means of a fluid pressure operated brake servo, not shown.

An overrunning brake outer race 131 is carrier by the drum 128. It registers with rollers 132 which cam against cam surfaces formed on the race 131. An inner race 134 situated within the rollers 132 is bolted by bolts 136 to an end wall 138 of the casing or housing 32. The race 134 also provides a bearing support for the hub 140 carried by drum 128.

Ring gear 72 is connected to a torque transfer drum 142, one end of which is connected to a radially extending disc 144 carried by the power output shaft 146. This shaft extends through a bearing support sleeve 143 carried by the end wall 138. A tailshaft extension housing, which surrounds the power output shaft 146, is bolted to the end wall 138 to form an extension of housing 32.

A parking brake gear 150 is splined to the power output shaft 146. It is formed with external teeth which register with a brake pawl, not shown. The pawl anchors the gear 150 to the housing.

An overdrive and high speed ratio clutch is situated between the gearing shown at 66 and the overrunning brake. This clutch includes a clutch element 158 connected directly by means of rivets, for example, to the carrier 78. It drivably carries friction clutch discs 160 which are in registry with and adapted to drivably engage clutch discs 162 carried by a clutch drum 164. The drum 164 includes a hub 166 which is splined to the shaft 42.

The cylinder 168 is defined by the drum 164. Positioned within the cylinder 168 is an annular piston 170 which cooperates with it to define a pressure cavity that is supplied with fluid pressure through a feed port 172.

Piston return spring 174 acts on the piston 170. It is seated on an anchor member 176 carried by the hub 166.

When fluid pressure is admitted to the cylinder 168, the friction discs become drivably engaged thereby connecting directly the clutch element 158 and the drum 164. The pressure force reaction is taken by a reaction ring 178 connected to the interior of the drum 164.

The torque delivery paths that are established during operation in the various speed ratios now will be described. In FIGURES 1A and 1B the clutch assembly shown in part at 112 and 114 is designated by reference symbol C3. The clutch assembly shown in part at 92 and 94 is designated by symbol C2. The clutch assembly shown in part at 160 and 162 is designated by symbol C1. The overrunning brake shown in part at 132 is designated by symbol C4. Brake band 64 is designated by symbol B2.

To establish low speed ratio operation brake band B2 is applied. This anchors the carrier for the planetary gear unit. Turbine torque developed by the torque converter 16 then is distributed through the shaft 86 and clutch C2 directly to the sun gear 70. Clutch C2 is engaged during operation in each of the forward driving speed ratios, except overdrive. The ring gear is driven with an underdrive speed ratio of 2.4 as the torque reaction is taken by the brake B2 and by the overrunning brake C4.

If an automatic upshift from the low speed ratio to the intermediate speed ratio is desired, brake band B2 can be released and the entire torque reaction then would be taken by the overrunning brake C4. An upshift to the intermediate speed ratio then is accomplished by applying brake B1 to anchor the forward sun gear 68. This will cause a speed-up of the ring gear 72 with respect to the turbine speed. A typical ratio value would be 1.47.

High speed ratio is accomplished by engaging simultaneously clutch C2 and clutch C1 as brake B1 is released. A split torque delivery path then is established with a portion of the torque being delivered hydrokinetically through the clutch C2 and the balance of the torque being delivered through the engaged clutch C1 to the carrier. The ring gear receives the combined output of each torque delivery path. If this split torque drive is not desired, however, clutch C3 may be engaged to lock up the planetary gear unit to produce a solid mechanical drive from the input shaft to the output shaft.

A shift to the overdrive ratio is accomplished by engaging brake B1. No other friction torque establishing device engagement or release is required. A typical overdrive speed ratio would be .67. Under these conditions the sun gear acts as a reaction member as torque is delivered to the carrier from the engine.

Reverse drive is accomplished by engaging brake B2 to anchor the carrier. Brake B2 is capable of accommodating reverse torque delivery as torque is delivered from the turbine through the engaged clutch C3 to the sun gear 68.

FIGURES 2A and 2B show a manual valve 200, a shift T.V. value 210, a vacuum modulator valve 212, a 1–2 shift valve 214, a fluid pressure governor valve 216, a positive displacement pump 218 which serves as a pressure source, a line pressure regulator valve 220 and a driver-operator throttle kick-down valve 222.

The manual valve 200 comprises a movable valve element 224 having a first series of valve lands 226, 228 and 230 situated on one side of the valve element 224. Situated on the opposite side of the valve element 224 is a second series of valve lands 232, 234, 236 and 238. Valve element 224 can assume any one of the operating positions indicated by the symbols L, 2, D, OD, N and R. These symbols respectively identify the low speed range position, the second or intermediate speed range position, the fully automatic drive range position, the overdrive position, the neutral position and the reverse position. The space between lands 226 and 228 is in fluid communication with the space between lands 232 and 234. Valve element 224 is slidably situated in manual valve chamber 240. The space in the chamber 240 between the lands 232 and 234 continuously communicates with the passage 242 for all operating positions of the valve element 224.

The valve element 224 is shown in FIGURE 2B in the overdrive position. At that time the space between lands 236 and 238 communicates with the space between lands 236 and 234 through crossover port 244.

Each of the lands on the valve element 224 registers with an internal valve land formed in the valve chamber 240.

Passages 245, 246 and 248 communicate with valve chamber 240 in axially spaced locations on the upper side of the chamber 240.

Passage 250, together with passage 242, communicates with valve chamber 240 at the lower side thereof. The right-hand end of the valve chamber 240 as well as the left-hand end, is exhausted.

Passage 250 is pressurized and is in fluid communication with passage 242 when valve element 224 assumes the second or intermediate speed ratio position. It is exhausted when the manual valve element 224 assumes the other positions.

Passage 245 is pressurized by the passage 242 whenever the valve element 224 assumes a forward drive range position. These positions are the overdrive position, the D position, the 2 position and the L position. It is exhausted, however, during operation in reverse drive and when the manual valve element 224 assumes a neutral position.

Passage 246 is pressurized by passage 242 whenever the valve element 224 assumes the D position, the 2 position or the L position. It is exhausted at all other times. Passage 248 is pressurized by passage 242 whenever the manual valve element 224 assumes the 2 position or the L position. It is exhausted at all other times.

Passage 245 communicates with throttle kick-down valve chamber 252. Slidably situated in this chamber 252 is a throttle kick-down valve 254, which is formed with spaced valve lands 256 and 258. Valve chamber 252 communicates with exhaust port 260 and it communicates also with kick-down pressure passage 261, which is situated adjacent to land 258. This passage communicates with a shift valve assembly for one of the higher ratio shifts, although the shift valve assembly is not shown in this schematic drawing.

Kick-down pressure passage 264 also communicates with the chamber 252 on the right-hand side of the land 258. Valve element 254 normally is biased in the left-hand direction by valve spring 269. A control kick-down plug 262 is situated in the right-hand end of the chamber 252 and is biased normally in a left-hand direction by control pressure in passage 242; which communicates with right-hand end of plug 262. Spring 269 is seated on the plug 262.

A fluid locking element 267 is slidably situated in a chamber 265 which communicates with the chamber 252 at its right-hand end. This element normally is biased away from the chamber 252 by valve spring 263. The control pressure in passage 266 is distributed to the upper end of the element 267 when the manual valve element 224 is shifted to the reverse position. Passage 266 communicates with chamber 240 of the manual valve assembly at a location adjacent land 226. This passage is pressurized only when the manual valve element 224 is shifted to the reverse position. It is exhausted at all other times.

When the manual valve is shifted to the reverse position, element 267 moves into the chamber 252 thereby preventing shifting movement of valve element 258 to a down shift position and preventing communication between passage 245 and kick-down pressure passage 264. Normally, however, communication can be established between passages 245 and 264 as the valve element 254 is shifted to the "through detent" position. Valve element 254 is connected mechanically to the engine carburetor throttle so that element 254 engages the detent plunger 262 at the maximum wide open throttle setting for the engine. As the element 254 is moved beyond that position, a "through detent" kick-down shift occurs, and passage 245 is brought into communication with port 264. At the same time passage 260 is blocked.

The port 260 is blocked also when the valve element 254 is shifted to a part throttle position. At that time, however, passage 244 communicates with passage 261, but it does not communicate with passage 264. Passage 261 communicates with a higher speed ratio shift valve as indicated earlier.

Passage 264, however, communicates directly with the 1–2 shift valve assembly 214, thereby enabling the operator to shift the transmission to the lowest speed ratio if the vehicle speed is of sufficiently low magnitude to enable the shift to occur.

Shift valve 214 comprises a multiple land valve spool 268 having formed thereon space lands 270, 272, 274, 276 and 278.

A valve spring 280 acts on the right-hand side of the element 268, thereby urging the latter in a left-hand direction. That force is opposed by the force of governor pressure distributed to the left-hand side of the land 270 through passage 282. This passage in turn communicates with the governor 216 which develops in the passage 282 a governor speed signal related in magnitude to the driven speed of the shaft 146.

Line pressure is distributed from the manual valve to the 1–2 shift valve through passage 284, which communicates directly with line pressure passage 245. This pressure is pressurized as mentioned earlier, whenever the manual valve element 224 is in a forward drive range position.

When the 1–2 shift valve element 268 is in the position shown, communication is established through the valve chamber 286 between passage 284 and passage 288. This passage communicates with the 2–3 shift valve, shown in phantom, and holds the latter in a down-shifted position until the valve element 268 is moved to the up-shift position. When that occurs, passage 288 is exhausted through exhaust port 290.

When the valve element 268 assumes the position shown, communication is established between passage 284 and a passage 292, which communicates with the ratio controlling valve elements in the system. When this passage is pressurized, an automatic 1–2 shift occurs as pressure is distributed to the intermediate speed ratio brake.

During low speed ratio operation, pressure distributed to passage 248 is transferred through communicating passage 294, which communicates with the differential area defined by lands 272 and 270, thereby maintaining the shift valve 214 in the down-shift position.

A torque sensitive signal is distributed to the shift valve 214 through signal passage 296. This signal acts on the differential area of lands 274 and 272, thereby establishing a force that opposes the force of the governor pressure in passage 282.

The shift T.V. 210 is formed in two parts. These are identified separately by reference characters 298 and 300. Valve part 298 includes valve land 302 and valve land 304. Valve part 300 includes valve lands 306 and 308.

Each valve part is slidably situated in a shift T.V. valve chamber 310. The space between the lands 304 and 306 is in fluid communication with vacuum modulator pressure passage 312. This communicates with vacuum modulator valve element 314 slidably situated in chamber 316.

The valve chamber 316 communicates with line pressure feed passage 242. The signal in passage 312 is distributed to the left-hand side of the valve element 314 thereby providing a feedback force that opposes and balances the force applied to the stem 318. This force is established by a vacuum diaphragm in vacuum modulator 320, the right-hand side of the diaphragm in the modulator 320 is in communication with the intake manifold of the internal combustion engine. As intake manifold pressure increases, the force on the stem 318 increases. The output signal passage 312 communicates with the space between the lands 322 and 324 on the element 314 so that the degree of communication between passage 242 and the output signal passage 312, and the degree of communication between the passage 242 and exhaust port 326 are varied, thus producing a modulated pressure signal in passage 312 that is functionally rated in magnitude to the intake manifold pressure.

The output signal passage 296 then communicates with the chamber 310 through port 328, and exhaust port 330 communicates with the chamber 310 at a location intermediate lands 302 and 304 of the valve part 298. The right-hand end of the valve part 300, which is occupied by the spring 334, also is exhausted through port 332. Output signal port 328 communicates also with the right-hand side of valve land 336, which forms a part of the valve part 300. The diameter of land 336 is slightly less than the diameter of land 308.

The space between lands 306 and 308 communicates through passage 338 with the left-hand side of the land 302. A valve spring 340 acts on the left-hand side of the valve element 298, urging the latter in the right-hand direction. The space on the left-hand side of the valve land 302 communicates with port 330 through a central aperture formed in the valve element 298. This aperture is controlled by a one-way flow check valve 342, which permits fluid to flow from port 330 to passage 338 through the valve part 298, but which prevents flow in the opposite direction. Passage 338 communicates also with the chamber 310 at a location directly adjacent land 304.

Port 332 communicates with passage 344 which serves as an exhaust passage and which is in communication directly with passage 294. As mentioned earlier, this passage is exhausted at all times except when the manual valve element 224 assumes the 2 or L position. Passage 284 supplies control pressure to the 1–2 shift valve to urge the latter to the down-shift position. This augments the action of the pressure in passage 294, which serves the same purpose.

Passage 296 serves to distribute the output signal of the shift T.V. valve assembly to the 2–3 shift valve assembly 346 and to the 1–2 shift assembly 214 thereby providing a shift delay in the instance of either a 2-to-3 upshift or a 1–2 upshift.

During the deceleration of the vehicle from a standing start the vacuum signal in passage 312 begins to develop from a zero value to an intermediate value as the engine carburetor throttle is opened. Initially the passage 338 is exhausted since communication is established between passage 338 and the exhaust port 330 as communication is established between port 348 and the port 330. When the magnitude of the pressure in passage 312 exceeds the force of the spring 340, valve part 298 will begin to move in a left-hand direction. At that time valve part 298 will begin to modulate the pressure in passage 312 to produce a resultant signal in port 328 which is distributed to the shift valve to produce a shift delay. Until that point is reached, however, the signal value in port 328 is zero. Thus the minimum throttle 1–2 upshift point is determined only by the force of the spring 280 in the 1–2 shift valve assembly.

The relationship between the magnitude of the engine vacuum and the magnitude of the signal in passage 296 is not the same as the corresponding relationship between the magnitude of the signal in passage 312 and the magnitude of the vacuum pressure. The magnitude of the signal in passage 296 rises at a lesser rate than the vacuum control pressure signal because the area on the left-hand side of the land 302 is greater than the area on the right-hand side of the land 304.

When the magnitude of the pressure in the passage 312 is sufficient to cause the spring 334 to yield, the valve part 300 will begin to modulate. The feedback pressure in port 328, which is distributed to the right-hand side of the land 336, builds up at a lesser rate than the rate of pressure buildup in passage 312 after the valve part 300 begins to modulate. This is due to the fact that the area of the land 336 is less than the area of the land 306. The characteristic of the signal in passage 296 thus can be controlled to produce any desired shift point or shift delay. Shift points do not depend only on the magnitude of the signal in passage 312 since this signal only acts as an input to the shift T.V. valve assembly 210. This signal, however, is distributed directly to the line pressure control valve shown at 220 so that the control valve will regulate the pressure in passage 242, which is supplied by the pump 218. The passage 312 communicates directly with the left-hand side of the boost valve element 350, which forms a part of the regulator valve assembly 220.

The regulator valve element itself is shown at 352. It receives pressure from passage 242 and distributes an output signal through passage 354, which is received by a main regulator valve assembly. This forms a part of the pressure source of which the pump 218 is a part.

The same boost valve 350 receives pressure through passage 356 when the manual valve is shifted to the reverse drive position so that the output signal in passage 354 again is augmented when the transmission is operated in reverse drive. This produces a higher control pressure during reverse drive.

Control pressure in passage 294 is distributed to boost valve 350 also during continuous operation in the low speed ratio range thereby providing adequate coasting torque capacity.

When the throttle kick-down valve is moved to the kick-down position so that passage 264 is pressurized, control pressure is distributed to the normally exhausted passage 344. This causes the output signal in passage 296 to rise to the maximum line pressure and avoids dumping of the control pressure from passage 344 directly into the passage 338.

Having thus described a preferred form of my invention, what I claim and desire to secure by U.S. Letters Patent is:

1. In a power transmission mechanism for an automotive vehicle driveline having an internal combustion engine with a throttle controlled air-fuel mixture intake manifold, multiple ratio gearing having an input element drivably connected to said engine and an output element drivably connected to a driven member, fluid pressure operated clutch and brake servos for controlling relative motion of the gear elements to produce automatic speed ratio changes, a fluid pressure source powered by the engine, conduit structure connecting the pressure source to the clutch and brake servos, fluid pressure distributor valves in said conduit structure and partly defining the same for controlling distribution of pressure to said clutch and brake servos thereby initiating automatic ratio changes, a speed sensitive pressure signal passage, a torque sensitive pressure signal passage, each signal passage communicating with said shift valve means for initiating an automatic ratio controlling response, a vacuum modulator valve means communicating with said pressure source, said valve means being connected to a movable wall, one side of said wall being in communication with the engine intake manifold whereby manifold pressure changes will modify the modulating characteristic of said modulator valve to produce a vacuum signal, a vacuum signal passage communicating with said vacuum modulator valve, a shift modifying T.V. valve establishing controlled communication between said vacuum signal passage and said torque sensitive pressure signal passage, said T.V. valve comprising a valve spool, a valve chamber receiving said valve spool, said vacuum signal communicating with said valve chamber on one side of said valve spool, a precalibrated spring acting on said valve spool and urging the latter against a pressure force established by said vacuum signal, said valve spool, upon yielding of said valve spring, establishing a modulated pressure signal in said torque sensitive signal pressure passage which acts on a valve land on said valve spool of lesser diameter than that of the area on said valve spool upon which said vacuum signal acts whereby the rate of change of said torque sensitive pressure signal during changes in magnitude of said manifold pressure is less than the corresponding changes in the magnitude of said vacuum signal.

2. In a power transmission mechanism for an automotive vehicle driveline having an internal combustion engine with a throttle controlled air-fuel mixture intake manifold, multiple ratio gearing having an input element drivably connected to said engine and an output element drivably connected to a driven member, fluid pressure operated clutch and brake servos for controlling relative motion of the gear elements to produce automatic speed ratio changes, a fluid pressure source powered by the engine, conduit structure connecting the pressure source to the clutch and brake servos, fluid pressure distributor valves in said conduit structure and partly defining the same for controlling distribution of pressure to said clutch and brake servos thereby initiating automatic ratio changes, a speed sensitive pressure signal passage, a torque sensitive pressure signal passage, each signal passage communicating with said shift valve means for initiating an automatic ratio controlling response, a vacuum modulator valve means communicating with said pressure source, said valve means being connected to a movable wall, one side of said wall being in communication with the engine intake manifold whereby manifold pressure changes will modify the modulating characteristic of said modulator valve to produce a vacuum signal, a vacuum signal passage communicating with said vacuum modulator valve, a shift modifying T.V. valve establishing controlled communication between said vacuum signal passage and said torque sensitive pressure signal passage, said T.V. valve comprising a valve spool, a valve chamber receiving said valve spool, said vacuum signal communicating with said valve chamber on one side of said valve spool, a precalibrated spring acting on said valve spool and urging the latter against a pressure force established by said vacuum signal, said valve spool, upon yielding of said valve spring, establishing a modulated pressure signal in said torque sensitive signal pressure passage which acts on a valve land on said valve spool of lesser diameter than that of the area on said valve spool upon which said vacuum signal acts whereby the rate of change of said torque sensitive pressure signal during changes in magnitude of said manifold pressure is less than the corresponding changes in the magnitude of said vacuum signal, a second valve spool communicating with said vacuum signal passage, an exhaust port communicating with an intermediate portion of said second valve spool, a feedback passage extending from said torque sensitive signal pressure passage to another area on said other valve spool, said second area being greater than the area on said second valve spool on which the vacuum signal acts, and a valve spring urging said second valve spool in a direction to oppose the pressure force of said vacuum signal whereby the rate of change in the magnitude of the torque sensitive signal for low manifold pressure changes is higher than the corresponding rate of change in said vaccum signal.

3. The combination as set forth in claim 1 wherein said pressure source includes a regulator valve assembly, said vacuum signal passage communicating with said regulator valve assembly to establish a modified control pressure as the engine manifold pressure changes thus producing a higher clutch and brake capacity as the engine torque increases.

4. The combination as set forth in claim 2 wherein said pressure source includes a regulator valve assembly, said vacuum pressure signal passage communicating with said regulator valve assembly to establish a modified control pressure as the engine manifold pressure changes thus producing a higher clutch and brake capacity as the engine torque increases.

5. The combination as set forth in claim 1 wherein said valve springs urge the respective valve spools to a position that blocks the communication between said manifold pressure passage and said torque sensitive signal passage when the magnitude of said vacuum pressure signal is reduced.

6. The combination as set forth in claim 2 wherein said valve springs urge the respective valve spools to a position that blocks the communication between said manifold pressure passage and said torque sensitive signal passage when the magnitude of said vacuum pressure signal is reduced.

7. The combination as set forth in claim 5 wherein the magnitude of the spring force acting on said second valve element is less than the magnitude of the force of the spring acting on said first valve spool.

8. The combination as set forth in claim 6 wherein the magnitude of the spring force acting on said second valve element is less than the magnitude of the force of the spring acting on said first valve spool.

References Cited

UNITED STATES PATENTS

| | | | |
|---|---|---|---|
| 3,023,632 | 3/1962 | Flinn | 74—864 |
| 3,095,755 | 7/1963 | Duffy | 74—864 |
| 3,308,676 | 3/1967 | Zundel et al. | 74—869 X |
| 3,310,991 | 3/1967 | Leonard | 74—869 X |
| 3,327,554 | 6/1967 | Searles | 74—869 |
| 3,336,815 | 8/1967 | Leonard | 74—864 |

ARTHUR T. McKEON, Primary Examiner

U.S. Cl. X.R.

74—762; 192—4